Oct. 10, 1961
D. M. GREASON
3,003,581
FIBROUS GLASS AIR FILTERS
Filed Dec. 26, 1957
2 Sheets-Sheet 2
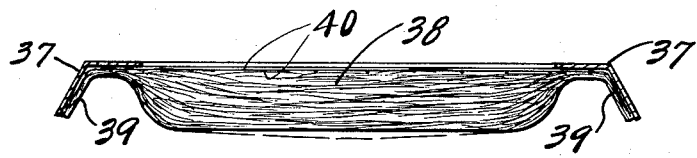
FIG-10-
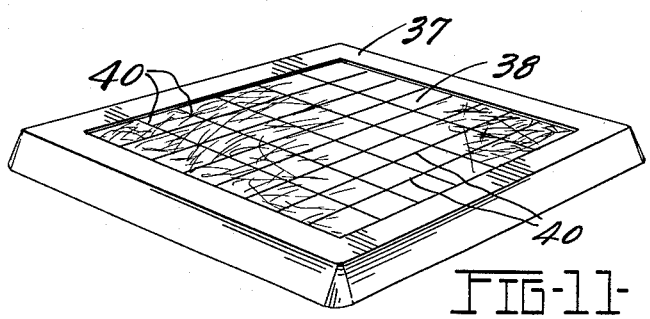
FIG-11-
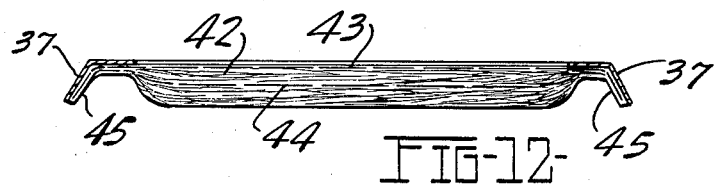
FIG-12-
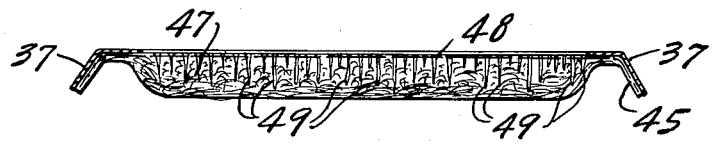
FIG-13-
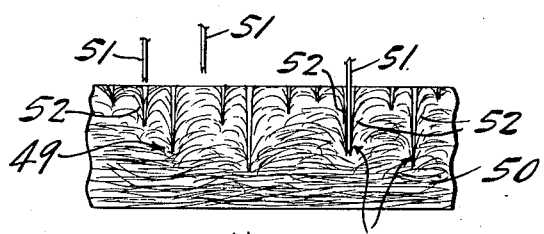
FIG-14-
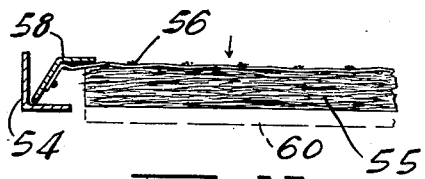
FIG-15-
INVENTOR:
DAVID M. GREASON.
BY
ATT'YS.

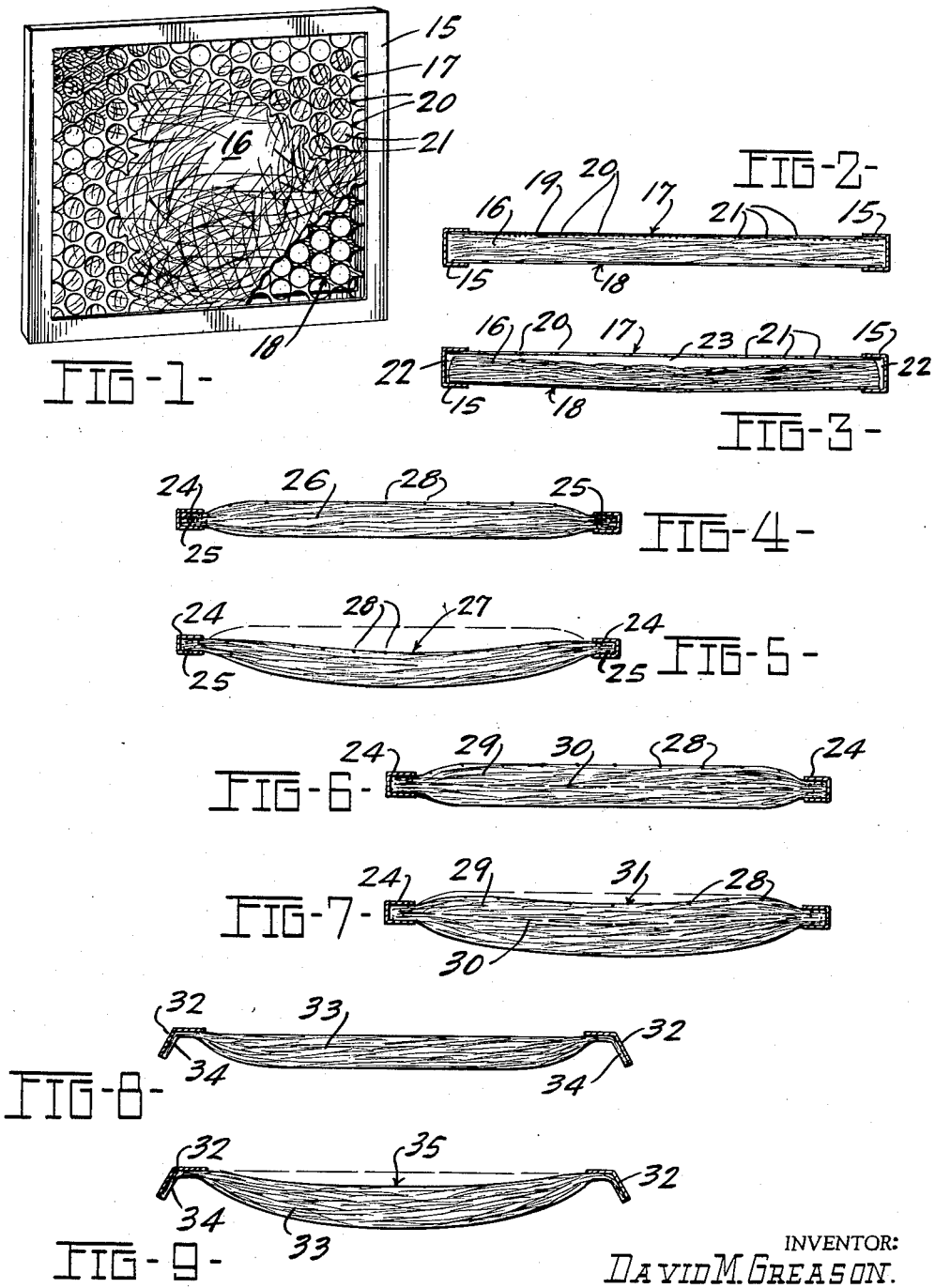

United States Patent Office 3,003,581
Patented Oct. 10, 1961

3,003,581
FIBROUS GLASS AIR FILTERS
David M. Greason, Newark, Ohio, assignor to Owens-Corning Fiberglas Corporation, a corporation of Delaware
Filed Dec. 26, 1957, Ser. No. 705,319
13 Claims. (Cl. 183—49)

This invention pertains to unitary fibrous glass air filters, and more particularly to fibrous glass filters which are capable of maintaining their air cleaning capacity when handling air flowing at high velocities. While filters of this class generally collect particles carried by the air through the impingement of the particles against the fibers, this invention is also adaptable to fibrous filtering masses attracting and holding such aerosols through electrostatic charges.

Filters of glass fibers, in which the fibers are coated with a sticky substance for holding particles impinged against the fibers, were first placed on the market over twenty-five years ago. Because of their high efficiency, long life and reasonable cost, they were rapidly established as the leading product in this field. Not only has their filtering function been superior to that of other competing media but their fibrous glass component could not be excelled in qualities of durability, inertness to corrosive agents, lack of absorbency and fire deterence.

This leadership has been so marked that fibrous glass filters now constitute a major portion of the filtering units in use. Domestic air conditioning and heating installations in which air is forcibly moved by a fan or blower at present comprise the largest field for fibrous glass air filters, both as original components and for replacement purposes. With millions of air conditioners presently sold annually, and the greater quantity of air conditioners and forced air heating units previously installed, the great size of this market may be visualized. The recognition of the definite benefits of the filtration provided, by which dust, dirt, lint and pollen are removed from the air before it reaches occupied areas, accounts for the wide demand and use of the product in such air handling apparatus.

The outstanding commercial success of fibrous glass filtering units may not be credited solely to the superior inherent qualities of this filtering media, as the attractive, economical, simple form in which these units have been produced as well as excellent sales promotion and service facilities have contributed tremendously to the public acceptance of this product. The structural design of the most successful air filter unit has remained substantially unchanged for many years and has served most satisfactorily due to its ruggedness, efficiency and low cost.

The maximum velocities of air flow for which this established filtering unit was designed, and which have not been exceeded in the operation of most ventilating and heating equipment produced in the meantime, are considered as being within the range between three and four hundred feet per minute.

With the continued trend in housing architecture toward simplified designs of one-story construction, utilizing concrete slab foundations, eliminating basements and minimizing loft areas, the conservation and allocation of space has become a critical problem. As their part in providing a solution, manufacturers of hot air heating equipment have reduced the size of their products, while striving to maintain the heat delivery capacity thereof. In furtherance of the same objective, builders have installed smaller air distributing ducts, enclosing them frequently within the limited dimensions of a poured foundation.

In order to transfer heat at a rate comparable to that provided by larger apparatus and duct work, the air flow through the restricted chambers of the burner and the smaller distributing conduits must be at a greatly increased rate, involving a higher velocity, a stronger driving force, and in amplified volume per unit of cross sectional area. Velocities as high as six hundred feet per minute are now developed in some installations, and in the course of continued improvement much higher velocities may be anticipated.

Air moving at these accelerated velocities has a disruptive effect upon the functioning efficiency of the light, fibrous glass bodies of the conventional air filters. A loss in filtering capacity may be derived from a number of reactions to the augmented force of the air flow.

To a degree, relative to their fineness, the fibers of which the glass wool is composed will be bent into arc shape from their normal orientation in substantially straight lines transverse of the filter panel. The surface area of the fibers against which air borne particles may impinge is thus proportionately reduced by such deformation.

Of a more serious nature is the depression and compacting of the filtering mass against a retainer on the outlet side of the filter unit. This compression, when dust particles have collected on the glass fibers, produces greater resistance to the passage of air through the filter, thereby retarding air flow and curtailing delivery of the heat energy carried thereby. This harmful effect is accumulative as the more the flow is blocked the more the pressure against the filter rises to compress it further.

Another aspect of the depression of the fibrous glass panel is that it is likely to draw the edges of the panel inwardly away from contact with the walls of the retaining channel in the frame and thus create gaps through which air may pass unfiltered.

Compaction of the glass wool is inclined to be greater in the center of the panel. This has the objectionable consequence of concentrating the air flow and accompanying filtration of the air in the surrounding, less compacted, and accordingly more porous area of the panel. The capacity of this smaller portion for retaining impinged particles becomes saturated more rapidly and the effective life of the filter unit is thus foreshortened.

The principal object of this invention is to provide an improved air filter which does not have the cited deficiencies in handling the higher velocity air streams of the most modern heating installations.

Other attempts to meet this new need have not been too successful, possibly due to a lack of full understanding of the nature of a bonded mass of glass fibers and the effect thereon of a vigorous flow of air. The natural and plausible corrective step to better a situation where an element does not adequately oppose applied pressure is to back-up the element with stiffening members. Based upon this normal conclusion, strengthening ribs or grids have been placed on the outlet side of and within the body of filtering masses.

Such arrangements are quite successful in combating the panel bowing effect of high velocity air but fail to lessen the compacting of the fibrous mass to a worthwhile degree. Alternately, a shielding element simply placed against the inlet face of a filter does not, of course, reduce compression, except to the extent that it blocks and cuts down the air flow.

However, applicant has determined that, in effect, suspending the filtering panel from comparatively taut, supporting elements extending across and attached to the inlet face of the air filter not only obviates disarrangement of the inlet side of the filtering mass, but also acts to prevent compressing of the main body of the panel. The latter is more completely accomplished when the outlet side of the air filter is left free, as in preferred embodiments of the invention.

The effectiveness of this arrangement is contrary to ordinary expectations, as in considering a light filtering mass of fibrous glass, its very easy compression under light pressure may be noted as well as its apparently low overall coherence. Nevertheless, in spite of the sparse distribution of the fibers and their somewhat fluffed up nature, such a mass has a certain tensile strength through its thickness, which is a requisite of this invention, and the same property to a greater extent transversely.

This last characteristic of a fibrous glass filtering body is derived from the fact that the individual fibers are generally disposed in planes parallel with the transverse plane of the panel, and the fibers are inclined to be held together by the binder in quite imperceptible veils, in strata arrangement, with much greater tensile strength cross-wise of the panel than through the thickness between the inlet and outlet sides. This structural property is comparable to the tautness of the elements laid across and in attachment with the face of the filtering panel, according to this invention; and cooperates therewith in establishing the stability of the fibrous mass, particularly in the form of the invention most favored by applicant in which the edge of the filtering panel is firmly secured with the face attached elements in a peripheral frame.

A filtering unit of the above design as well as other embodiments of the invention are hereafter described in more detail. Further objects and benefits of the invention are also brought out in this description, and in the disclosures of the accompanying drawings, in which:

FIGURE 1 is a perspective view of an air filter of generally conventional structure, modified by the attachment of the perforated retainer to the inlet face of the fibrous glass panel, according to the precepts of this invention;

FIGURE 2 is a cross section of the embodiment of FIGURE 1;

FIGURE 3 is a section similar to that of FIGURE 2 of the same air filter, but without the retainer attached to the inlet face, and indicating the extent of deformation of the filtering panel resulting from vigorous air flow;

FIGURE 4 shows a cross section of an air filter embodying the invention and of a special form having certain characteristics superior to those of the previously illustrated embodiment;

FIGURE 5 is a like section of the embodiment of FIGURE 4 depicting the deformation of the filtering media resulting from the force of a high velocity air stream;

FIGURE 6 is a sectional view of an air filter similar in structure to that of FIGURES 4 and 5 but with the addition of transverse elements within the fibrous glass panel of the filter;

FIGURE 7 illustrates in section the deforming effect of a high velocity air stream upon the air filter of FIGURE 6;

FIGURE 8 is a sectional view of an air filter of an advanced design considered particularly qualified for advantageously incorporating features of this invention;

FIGURE 9 discloses in section the reaction of the filter of FIGURE 8 to the passage therethrough of a high velocity air stream;

FIGURE 10 is a section of a filter like that of FIGURES 8 and 9 with the addition thereto of transverse elements attached to the inlet face thereof, in practice of the concept of this invention;

FIGURE 11 is a perspective illustration of the filter of FIGURE 10;

FIGURE 12 is a section of the embodiment of FIGURES 10 and 11, modified by having transverse elements within the fibrous glass filtering panel, in addition to those attached to the inlet surface;

FIGURE 13 illustrates in section a filter like that of FIGURES 10 and 11 but in which the filtering panel is prepared from a pack of glass fibers in which, before the pack is cured, randomly selected fibers have been re-oriented, at least in part, from a position, generally parallel to the transverse plane of the pack and the final panel, to one normal thereto;

FIGURE 14 is an enlarged, partial section of an uncured fibrous glass pack being pierced by needles to reorient occasional fibers from positions generally coplanar with the pack to ones substantially normal thereto to form the filtering panel of the filter unit of FIGURE 13; and, FIGURE 15 is a section of another embodiment of this invention.

Referring now to the drawings in more detail, the air filter of FIGURES 1 to 3 conforms generally with that of a conventional design of established merit. It has a peripheral, fiberboard frame 15 within the U-channel of which the edges of the glass fiber panel 16 are enclosed. Held respectively against the air inlet and air outlet faces of the panel (here differentiated for purposes of discussion) are the closely perforated, protective sheets 17 and 18. The edges of the sheets also extend within the U-channel of the frame.

The inventive concept is incorporated in this air filter through the adhesive attachment 19 of the sheet 17, throughout substantially its full skeletal formation 20 surrounding the openings 21, with the contiguous inlet face of the filtering panel 16. This attachment is preferably secured by coating the skeletal formation 20 with an adhesive substance, and then pressing the sheet 17 against the panel 16, after the latter has been dimensionally stabilized through curing of the binder by which the glass fibers of the mass are tied together at cross-over contact points. A phenolic resin such as that employed as a glass fiber binder serves effectively as the adhesive substance joining the sheet 17 to the panel surface. There are many other synthetic adhesives, such as ureas and melamines, which also would be satisfactory for this purpose.

Instead of using a separate adhesive material for attaching the sheet 17 to the face of the filtering panel, the binder component of the glass fiber stock may be utilized for this purpose. This is accomplished by curing the binder with the glass stock superimposed upon the sheet. The heat setting of the binding agent originally carried on the fibers in contact with the sheet, amplified by any additional binder flowing downward to the contact areas, then attaches the sheet to the fibrous glass stock. In this procedure, the glass fibers coated with the uncured binding agent could be collected and formed into a pack immediately upon the sheet material.

The benefits of this invention are more fully realized with this filter structure by positively connecting the sheet 17 with the frame 15, as for instance, by interposing an adhesive layer between the border of the outer side of the sheet and the overlapping portion of the frame. With or without the arrangement, so modified, the comparative rigidity of the skeletal sheet acts to hold it in planar form; and the fibrous glass panel with its attachment to the sheet, and suspended therefrom through its internal mass coherency, in line with the air flow, is not ordinarily compressed, at least in its upper portion, by the force of the air stream. There is likely, however, to be some compacting of the adjacent portion of the panel against the sheet 18 on the outlet side of the panel. Also, if the pressure exerted by the air movement is sufficiently great the inlet side of the panel and the sheet 17 may be depressed, although not to a serious extent if the borders of the sheet 17 are adhered to the frame 15.

In FIGURE 3 the reaction to high air velocity of such a filter unit, in which the panel is unattached to the sheet 17, is illustrated. Due to the depression 23 of the inlet side of the panel and the fairly rigid support of the outlet side by the sheet 18 compression of the fibrous glass mass occurs with the attendant loss in air permeableness thereof. This deformation is apt to draw the edges of the panel inwardly to form side gaps 22 through which some of the air may flow without thorough filtration.

The filter units of FIGURES 4 through 7 are of a special design in which the edge of the filtering panel is secured firmly to the frame 24. This attachment is accomplished through compression of the edge and its adhesively held insertion within the narrow receiving channel of the frame. The binder component of the glass fiber stock, if present in sufficient quantity, may serve this adhering purpose; or an addition of this component or the application of another adhesive material could be made to the border of the panel to so join it to the frame.

Preferably at the time the binder of the fibrous glass panel is cured the adhesive attachment of the panel to the frame is set. Concurrently, cords or yarns 28 of glass fibers laid across the inlet side of the panel, in a simple parallel arrangement or wide mesh formation, are adhered to the face of the panel and fixed at their ends within the frame 24 with the compressed edge 25 of the panel.

With a filter unit so constructed the tensile strength of the transverse strata-like formation of the bonded fibrous mass cooperate with the like property of the affixed cords or yarns in opposing the drive of fast moving air. However, the original outward curve of the inlet face of the panel prevents the establishment or increase in tautness thereof when this surface is depressed. Compensating to some extent therefor, is the fact that the outlet side of the panel is free to bulge outwardly and this movement tends to maintain the original thickness of the filtering mass. With the tight joint between the panel and the frame there is no opportunity for the air to work a passage therebetween.

The depression of the inlet surface of a filter of this design may be lessened by incorporating, as shown in FIGURES 6 and 7, an interliner 30 across the mid section of the panel 29. This may comprise spaced cords or an open weave fabric of glass fibers and is also fastened at the sides within the frame 24. Being disposed in a single plane it may be stretched tightly and gives only slightly under pressure. It thus acts to maintain in place the portion of the panel suspended in adherence to it on the outlet side.

In FIGURES 8 and 9 is shown, in section, a filter unit of a novel and very promising nature. The filtering panel 33 is compressed at its edges to a thin web 34 which is adhered to a simple fiberboard frame 32. Among the advantages of this filter unit are its low cost, the flexible edges adapting it to fit snugly into holders, the firm connection between the filter panel and frame, and its open air-receiving area.

However, without the benefit of elements of this invention, this design of filter will also be distorted by fast flowing air, as indicated at 35 in FGIURE 9. Even though its outlet side is free to expand, it is curtailed from doing so sufficienlty to prevent compression of the pack inasmuch as its curved surface must stretch much more than does the inlet surface when both are moved the same distance downwardly. The outlet surface accordingly resists a downward thrust more strongly than the upper surface of the panel and the thickness of the panel is thus reduced under pressure.

In the practice of this invention, by attaching tautly drawn elements 40 across the inlet face of this filter, as depicted in FIGURES 10 through 13, the performance of this filter in withstanding the duress of accelerated air flow, may be brought to a particularly high level. The thread-like fibrous glass elements 40 are adhered to the face of the panel 38 and preferably sealed at their ends within the tight joint between the compressed edge 39 of the panel and the fiberboard frame.

The attachment of the elements may be accomplished in the compression assembly, under curing heat, of the panel and frame. Another method could comprise first adhering the elements to the frame and joining them later with the frame to the panel. Coated with an adhesive, the elements could also be fixed across the outer face of the otherwise completed unit and secured to the exterior surface of the frame. This would be a simplified procedure but the appearance of the resulting product might not be considered desirable.

With the inlet portion of the panel suspended from the lattice formation of the elements 40 it gives only slightly under pressure, and with the outlet portion left free to move outwardly, there is no problem of overall compression occurring with this design of air filter. Internal compacting may be obviated with the introduction of an interliner as shown at 44 in FIGURE 12.

Another method of lessening densification within the fibrous body of such a filter, constituting a minor feature of this invention, is utilized in the filter unit 47 of FIGURE 13 and limitedly illustrated in FIGURE 14.

As shown in FIGURE 13, the air filter has cords 48 stretched across the inlet face of the filtering panel 47 and secured with the compressed edge 45 thereof to the frame 37. The cords 48 are adhered to the surface fibers and support the fibrous mass of the panel through the bonded coherence thereof inwardly from the air inlet face of the panel. To increase the integrity of the fibrous mass below the inlet surface and strengthen the hold thereon by the cords, numerous glass fibers 49 lying adjacent and substantially parallel to the inlet surface have been reoriented, at least in part, to positions normal to the surface. These fibers act with others originally so arranged, through set binder connections with transversely disposed fibers, to tie together the semi-strata formation of the fibrous mass and to serve as links between the mass and the cords.

Extreme reforming of a pack in this manner is not advocated since the filtering efficiency is based on the extent of the area of the fibers facing the air stream, and it is accordingly desirable to have the largest majority of the fibers lying broadside to the airflow.

As shown in FIGURE 14, one method of so rearranging the fibers is by submitting the raw uncured pack 50, of which the panel is to be formed, to injections of slender fork-pointed needles 51. The needles through direct engagement force some fibers 49 into downward lines and indirectly turn other associated fibers 52 in the same direction. These secondary fibers also cooperate in building the coherence of the fibrous mass.

With a pack of glass fibers having sufficient coherence to be self-sustaining across its thickness dimension, the edges of the filtering panel may be left unattached to the frame of a filtering unit otherwise embodying the teachings of this invention. Such a unit is illustrated in FIGURE 15 in operative position in a holder 54. The glass fiber filtering panel 55 is adhesively attached to the taut elements 56 which in turn are secured to the frame 58. There is no positive connection in this design of unit between the panel 55 and the frame. As indicated the panel may expand under air flow to the extent of dotted line 60. The adherence of the filtering media to the taut surface elements, also serves to maintain the media in proper panel shape when subjected to rough handling and jarring during shipment and installation.

The various embodiments herein described, and presented in the drawings, all incorporate the basic concept of the invention of maintaining the integrity of a fibrous filtering panel placed in the path of a high velocity air stream by suspending the fibrous mass of the panel in the line of air flow from supporting means attached across the inlet side of the panel. This positioning of a strengthening member in front of, instead of behind, a pressure receiving area is a surprising procedure, and particularly so in connection with a glass fiber filtering panel which has little apparent tensile strength through its thickness.

While the inlet surface of the mass is considered the most desirable location of such supporting means, the hold of the means there placed may not reach sufficiently to the portion of the mass adjacent the outlet side. In such a situation like means are stretched across within the mass, attached to the fibers, to exert a retaining effect upon the said latter portion of the mass.

Benefits of the invention are fully realized with its incorporation in preferred designs of air filters, for instance those having a firm union between the filter panel and its frame, and which are unconfined on their outlet side.

Fibrous glass cords, yarns, or open mesh fabrics are believed superior as the base of the supporting formation, as they possess the same sturdy and inert properties as the glass fibers of the filtering mass, and present little surface area to interfere with the air flow. Course threads, cords, etc., of other composition would naturally serve the purpose with quite satisfactory results. Likewise, comparatively rigid members of metal, plastic or stiff paper composition could be affixed in a grid design to the inlet surface of the panels in the manner described in connection with the sheet 17 of the filter of FIGURES 1 through 3. Such members are not preferred, however, because of the greater air blocking area they present as well as their likely higher costs.

The following claims are primarily directed to the principal features of the invention and may, in order to promote better understanding thereof, be couched in terms specific to preferred materials and methods. However, numerous substitute or alternate elements, whether or not suggested herein, are readily perceivable, and in view of the broad scope believed possessed by the invention, specific terms of the claims should be interpreted as encompassing such elements.

I claim:

1. A fibrous air filtering unit for functioning in an air stream of high velocity including a frame, the frame having open air inlet and air outlet sides, a filtering panel of fibers, said fibers being interbonded to a sufficient degree to make the panel coherent and self-supporting through its thickness while resiliently expansible in its thickness dimension under the effect of an air stream of high velocity passing through the panel, and air permeable retaining means, supported by the frame, extending across the air inlet face of the panel in positive attachment with surface fibers of the panel and therethrough in supporting attachment with the whole filtering panel of interbonded fibers, the air outlet face of the panel being completely unconfined within its periphery and free to bulge outwardly in the direction of air flow, whereby when an air stream of high velocity is flowing through the panel, the panel is suspended in the air stream from the retaining means with depression by the air stream of the air inlet face of the panel limited by its attachment with the retaining means, while the panel expands through its thickness with the unconfined outlet face thereof bulging outwardly in the direction of air flow, the density of the air panel and the resistance to the flow of air therethrough being reduced by the increase in thickness of the panel thus produced.

2. An air filtering unit according to claim 1 in which the fibers of the filtering panel are fibrous glass.

3. An air filtering unit according to claim 1 in which the retaining means are substantially rigid.

4. An air filtering unit according to claim 1 in which the retaining means are inherently flexible in nature but are held taut from their ends.

5. An air filtering unit according to claim 1 in which the panel is adheringly joined to the frame.

6. An air filtering unit including a coherent, expansible filtering panel of bonded glass fibers, a frame in which the panel is held, said frame having open inlet and air outlet sides, an air permeable formation of continuous, multi-filament strands of fibrous glass fixed at its edges to the frame and drawn across the air inlet face of the filtering panel in adhering attachment to glass fibers in the surface of said face, and therethrough to the whole panel of bonded glass fibers, the air outlet face of the panel being unconfined and free to bulge outwardly in the direction of air flow, whereby, when an air stream of high velocity is flowing through the panel the thread-like formation of fibrous glass limits the depressing effect of the air stream upon the air inlet face of the panel, while the air outlet face of the panel may bulge through expansion of the panel by the air stream, thus lowering the compactness and the air resistance of the panel.

7. An air filtering unit according to claim 6 in which the thread-like formation of fibrous glass includes parallel strands.

8. An air filtering unit according to claim 6 in which the thread-like formation of fibrous glass comprises an open mesh fabric.

9. An air filtering unit according to claim 6 in which a second thread-like formation of fibrous glass is stretched through an intermediate plane of the panel, in parallel relation to the first mentioned formation, and in adhering attachment to glass fibers of the panel adjacent to said plane.

10. An air filtering unit according to claim 6 in which the filtering panel contains a mass of glass fibers a majority of which are disposed in planes transverse of the panel and a minority of which are disposed normal to such planes, said minority, through connections of a binding agent, serving to join the others together through the thickness of the panel and to the formation of fibrous glass across the inlet face of the filtering panel.

11. An air filtering unit having a filtering panel of bonded fibrous glass with an air inlet face and an air outlet face, the fibrous glass being sufficiently bonded to make said panel resiliently expansible but self-sustaining through its thickness, a mounting frame for said panel leaving the outlet face thereof free, unconfined and unsupported, whereby the outlet face may bulge outwardly under the effect of high velocity air flowing through the expansible panel, and there are reinforcing elements of multi-filament strands of fibrous glass, secured to the mounting frame, extending tautly across the panel and firmly attached to a first portion of the panel in spaced relation to the outlet face of the panel, whereby the said first portion of the panel is held against the depressing effect of high velocity air flow while a second portion of the panel immediately adjacent to the outlet face is expanded by high velocity air flow and the outlet face is bulged outwardly thereby, the compactness and air resistance of the said second portion of the panel being thus reduced.

12. An air filtering unit according to claim 11 in which the reinforcing elements extend across the interior of the panel spaced from the inlet face as well as from the outlet face thereof, the strands of the reinforcing elements being imbedded in the fibrous glass of the panel and having insufficient bulk to significantly divide the panel into sections.

13. In combination with structure providing a confined path for an air stream moving at high velocity from the entrance to the exit of said path, a fibrous air filtering unit installed in said path, the filtering unit including a frame, the frame having open air inlet and air outlet faces respectively in opposed relation to the entrance and exit of the confined path for the air stream, a filtering panel of fibers, said fibers being interbonded to a sufficient degree to make the panel coherent and self-supporting through its thickness while resiliently expansible in its thickness dimension under the effect of an air stream of high velocity passing through the panel, and air permeable retaining means, supported by the frame, extending across the air inlet face of the panel in positive attachment with surface fibers of the panel and therethrough in supporting attachment with the whole filtering panel of interbonded fibers, the air outlet face of the panel being completely unconfined within its periphery and free to bulge outwardly in the direction of air flow, whereby, with an air stream of high velocity flowing through the panel, the panel is suspended in the air stream from the retaining means with depression by the air stream of the air inlet face of the panel limited by its attachment with the retaining means, while the panel expands through its thickness with the unconfined outlet face thereof bulging outwardly in the direction of air flow, the density of the air panel and the resistance to the flow of air therethrough being reduced by the increase in thickness of the panel thus produced.

References Cited in the file of this patent

UNITED STATES PATENTS

| | | |
|---|---|---|
| 1,377,694 | Koehler | May 10, 1921 |
| 2,108,283 | Drew et al. | Feb. 15, 1938 |
| 2,124,370 | Gaarder | July 19, 1938 |
| 2,160,003 | Slayter | May 30, 1939 |
| 2,252,724 | Myers | Aug. 19, 1941 |
| 2,505,175 | Davis | Apr. 25, 1950 |
| 2,521,984 | Lang | Sept. 12, 1950 |
| 2,664,375 | Slayter | Dec. 29, 1953 |
| 2,715,453 | Lange | Aug. 16, 1955 |
| 2,754,928 | Hambrecht et al. | July 17, 1956 |
| 2,846,022 | Hubbard | Aug. 5, 1958 |

FOREIGN PATENTS

| | | |
|---|---|---|
| 482,543 | Great Britain | Mar. 31, 1938 |